106-89

United States Patent Office 3,427,175
Patented Feb. 11, 1969

---

3,427,175
ACCELERATOR FOR PORTLAND CEMENT
Richard L. Angstadt, Silver Spring, and Forrest R. Hurley, Ellicott City, Md., assignors to W. R. Grace & Co., New York, N.Y., a corporation of Connecticut
No Drawing. Filed June 14, 1965, Ser. No. 463,888
U.S. Cl. 106—89        1 Claim
Int. Cl. C04b 7/00, 7/56

ABSTRACT OF THE DISCLOSURE

A method of accelerating the hardening rate of Portland cement by adding 0.1 to 10% calcium nitrite based on the dry weight of the cement. This accelerator is advantageous in that it also inhibits corrosion of the metals placed in the cement as reinforcing bars, etc.

---

This application relates to a cement composition having an accelerated hardening rate and the ability to inhibit corrosion of reinforcing steel employed therewith, and to the method for making this composition.

In summary, the process of this invention is a method for producing a cement mixture having an accelerated hardening rate comprising adding to an alite cement from about 0.1 to 10 percent calcium nitrite based on the dry weight of the cement binder, and intimately mixing the ingredients to provide a uniform distribution of the calcum nitrite throughout the cement.

In summary, the process of this invention is a method for accelerating the rate of hardening of an alite cement comprising mixing an alite cement, water, and from 0.1 to 10 percent of calcium nitrite based on the dry weight of the cement binder, and allowing the mixture to harden.

In summary, the composition of this invention is an alite cement containing from about 0.1 to 10 percent calcium nitrite based on the dry weight of the cement binder.

In many of the uses of alite cement, of which portland cement and mortars and concretes containing portland cement, are the most common examples, it is desirable to accelerate the rate of hardening and strength development thereof. As the rate of hardening is accelerated, heat evolution is also accelerated, and the additional heat is useful in winter for keeping the water in the cement from freezing. Furthermore, in many uses it is desirable that the concrete hardening be sufficiently slowed to enable the concrete to be poured in place, but after the concrete is placed, rapid hardening is desired. In the production of molded objects of concrete, accelerated hardening allows the use of fewer mold and lowers the necessary capital investment. In the process for cementing oil wells, the cement must remain sufficiently fluid to be deposited in the well, but it is desirable to accelerate hardening of the deposited cement rapidly thereafter.

A wide variety of inorganic compounds has been found to be active accelerators of alite cement hardening. These prior accelerators have one or more undesirable properties. The most commonly employed and most active accelerator is calcium chloride. However, calcium chloride has a serious deficiency. The calcium chloride in the cement promotes corrosion of iron reinforcing rods and mesh often used in concrete construction, since calcium chloride is itself extremely corrosive.

It is one object of this invention to provide a method for accelerating the hardening rate and strength development of alite cements with a non-corrosive accelerator.

It is another object of this invention to provide alite cements having an accelerated rate of hardening and strength development but which do not contain a corrosive accelerator.

It is still another object of this invention to provide alite cements with an accelerator which inhibits the corrosion of steel reinforcements employed therewith.

The binder component in the cements, mortars and concretes used widely as a construction material is portland cement. Portland cement is manufactured by calcining a mixture of limestone and clay to form a clinker, and by grinding the clinker to a fine powder. The major compounds found in portland cement are tricalcium silicate, dicalcium silicate, tricalcium aluminate, and tetracalcium aluminoferrite. The tricalcium and dicalcium silicates are thought to be the principal bonding constituents in the portland cement. Tricalcium silicate, when mixed with water, forms a calcium silicate hydrate known as tobermorite gel and calcium hydroxide. The dicalcium silicate, when contacted with water, forms similar products but at a much lower rate of reaction. The tricalcium silicate, having the greater rate of reaction determines, to a large extent, the hardening rate of the cement. To provide materials which are suitable for different uses, portland cements having a range of hardening rates have been found desirable. By producing cements having a range of proportions of tricalcium silicate present, a range of hardening rates and strength development has been obtained. Four general types of portland cements, varying principally in the relative quantities of tricalcium silicate and dicalcium silicate present therein, are commonly produced. The proportions of the principal compounds present in each type of cement are shown in Table I.

TABLE I

| Cement type | I | II | III | IV |
|---|---|---|---|---|
| Composition, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "alite cement" is defined as including neat pastes, mortars, and concretes and the mixed, dry unreacted ingredients of neat pastes, mortars, and concretes, comprising as alite cement binder, a composition containing greater than 20 percent tricalcium silicate based on the dry weight of the composition. The most common alite cements are portland cements, and mortars and concretes containing portland cements. Most commercially available alite cements contain binders comprising from about 20 to 75 percent tricalcium silicate. The alite cement binder, or concrete binder is the component which provides the desired bonding, for example, portland cement.

A wide range of the hardening rates can be obtained by producing cement having varying quantities of tricalcium silicate such as are shown in Table I. However, the particular proportion of the cement ingredients and the rate of hardening obtained is limited by the types of raw materials from which the cement is produced. As a result, for some uses even the Type III cement does not harden at a desired accelerated rate. Furthermore, in some uses, such as in oil well treatment, a very low rate of initial hardening is desired so that the cement can be mixed and placed before it loses its fluidity. However, once in place, it is desirable to provide a rapid rate of hardening.

Accelerators are employed to meet these requirements. Accelerators are compositions which have been found to increase the initial rate of hardening of a cement and the rate of strength development. The most widely used cement, mortar and concrete accelerator is calcium chloride. However, this compound creates serious difficulties when iron reinforcing rods and mesh are employed in concrete construction. Calcium chloride is extremely corrosive.

Calcium nitrite has been found to be a superior accelerator for alite cement. The calcium nitrite which provides a rapid alite cement hardening rate and strength development, is a noncorrosive accelerator. Moreover, calcium nitrite has been found to inhibit corrosion of iron and steel reinforcing structures employed therewith. This is extremely important where concrete structures are subject to salt attack, such as coastal installations and where salt is used for ice and snow removal. Acceleration of alite cements with calcium nitrite can be obtained with from about 0.1 to 10 percent $Ca(NO_2)_2$ in the present binder, based on the weight of the cement composition. Preferably, from about 1 to 4 percent calcium nitrite is employed. Concentrations of calcium nitrite greater than about 10 percent cause excessive hardening rates, and the cement dilution impairs the strength of the hardened product.

The calcium nitrite can also be used together with other accelerators. If calcium nitrite is employed together with an accelerator containing chloride ions, the quantity of the chloride component present, expressed as $CaCl_2$, should be less than 70 percent of the total weight of the calcium nitrite and chloride containing accelerators present if corrosion of steel reinforcing members is to be prevented. Preferably, the accelerator is substantially chloride free.

The calcium nitrite can be added to the alite cement by various techniques. Calcium nitrite can be added to alite cement clinker prior to grinding and can be thoroughly mixed with the cement component during the grinding step. The calcium nitrite can also be added to the binder cement powder as a dry powder, slurry, or water solution, and the ingredients can be thoroughly mixed to uniformly disperse the active ingredients. The calcium nitrite can be dissolved in the water with which the binder is mixed to form a hardening composition. The alite cement binder can be premixed with water and then mixed or contacted with the calcium nitrite accelerator. For example, in processes for cementing wells, the cement can be deposited on the interior well wall, and the calcium nitrite in a water solution can be contacted with the deposited cement to provide an accelerated hardening rate. In general, the accelerator can be added to the cement at any stage prior to its final hardening.

Our invention is further illustrated by the following specific, but non-limiting examples.

EXAMPLE 1

This example shows the acceleration of Type I Portland cement hardening with calcium nitrite.

The calcium nitrite employed was made from calcium chloride and sodium nitrite by ion exchange techniques and was free of chloride ions. The calcium nitrite contained a minor proportion of sodium nitrite. Cements were prepared containing a range of concentrations of calcium nitrite and having a water to cement weight ratio of 0.40. The setting times were determined according to the ASTM Standard Method of Test for Time of Setting of Hydraulic Cement by Vicat Needle (ASTM C 191–58). The setting times found are shown in Table II.

TABLE II $Ca(NO_2)_2$ concentration,
| wt. percent of cement: | Time of set |
|---|---|
| 0 | 6 hrs., 10 min. |
| 0.56 | 4 hrs., 31 min. |
| 1.13 | 3 hrs., 40 min. |
| 2.26 | 2 hrs., 41 min. |

EXAMPLE 2

This example shows the acceleration of strength development of Portland cement mortars with the calcium nitrite of Example 1 under conditions of steam curing.

Type III Portland cement was employed in this procedure. The calcium nitrite was dissolved in the mix water in a quantity sufficient to provide 1.13 wt. percent $Ca(NO_2)_2$ based on the weight of the Portland cement to be mixed therewith. The calcium nitrite mix solution was then mixed with the Portland cement in a water to cement weigth ratio of 0.67. Two inch moratar cubes were cast, according to the procedure of ASTM Standard Test C–109. The cubes were hydrated for 12 hrs. at 60° C. and 100% R.H., and the compressive strength of the cubes was determined. Cubes containing no calcium nitrite were found to have a 12-hr. compressive strength of 1550±94 p.s.i. Cubes containing 2.0 weight percent $Ca(NO_2)_2$ were found to have a 12-hr. compressive strength of 2079±84 p.s.i.

EXAMPLE 3

This example shows the acceleration of strength development of Portland cement mortars with calcium nitrite under conditions of steam curing.

The $Ca(NO_2)_2$ was made by the reaction of gaseous NO and $O_2$ with a $Ca(OH)_2$ slurry.

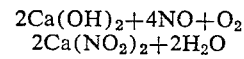

X-ray diffraction analysis confirmed $ca(NO_2)_2$ to be the major product of this reaction. Calcium nitrate,

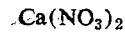

is the main impurity. The product is $Na^+$ and $Cl^-$ free except for the trace amounts present in the reagent grade $Ca(OH)_2$ used.

A Type III Portland cement was employed in this procedure. The calcium nitrite was dissolved in the mix water in a quantity sufficient to provide 1.76 weight percent $Ca(NO_2)_2$ based on the weight of the Portland cement to be mixed therewith. The calcium nitrite mix solution was then mixed with the Portland cement in a water to cement ratio of 0.67. Two inch mortar cubes were cast according to the procedure of ASTM Standard Test C–109. The cubes were hydrated for 12 hrs. at 60° C. and 100% R.H., and the compressive strength of cubes was determined. Cubes containing no admixture were found to have a 12-hr. compressive strength of 1550±94 p.s.i. Cubes containing 1.76 weight percent $Ca(NO_2)_2$ were found to have a 12-hr. compressive strength of 2247±148 p.s.i.

EXAMPLE 4

This example shows the acceleration of Type II and Type III Portland cement hardening with the calcium nitrite of Example 3.

A Type II and a Type III portland cement were admixed with a calcium nitrite solution such that the concentration of calcium nitrite was 1.76 weight percent based on the weight of the portland cement to be mixed therewith. The water to cement ratio was 0.40. The setting times were determined according to the ASTM Standard Method of Test for Time of Setting of Hydraulic Cement by Vicat Needle (ASTM C 191–58). The setting times found are shown in the Table III.

TABLE III

| Cement type | $Ca(NO_2)_2$ concentration, wt. percent of cement | Time of set |
|---|---|---|
| II | 0 | 6 hrs. 17 min. |
| II | 1.76 | 2 hrs. 20 min. |
| III | 0 | 4 hrs. 8 min. |
| III | 1.76 | 1 hr. 21 min. |

EXAMPLE 5

This example shows the acceleration of strength development of portland cement mortars with the calcium nitrite of Example 3 under normal conditions.

A Type I portland cement was employed in this procedure. The calcium nitrite was dissolved in the mix water in a quantity sufficient to provide 1.59 weight percent $Ca(NO_2)_2$ based on the weight of the portland cement to be mixed therewith. The calcium nitrite mix solution was then mixed with portland cement in a water to cement weight ratio of 0.67. Two inch mortar cubes were cast according to the procedure of ASTM Standard Test C-109. The one, three, and seven day compressive strengths were determined. The results are given in the following table:

| $Ca(NO_2)_2$ concentration, wt. percent of cement | Compressive strengths | | |
|---|---|---|---|
| | 1 day | 3 days | 7 days |
| 0 | 513±22 | 1,438±69 | 2,639±295 |
| 1.59 | 715±33 | 1,939±66 | 3,409±249 |

EXAMPLE 6

This example shows the acceleration of Type I portland cement hardening with the calcium nitrite of Example 3.

This example is similar to Example 1 except for the method of preparation of the calcium nitrite. Cements were prepared containing a range of concentrations of calcium nitrite and having a water to cement ratio of 0.40. The setting times were determined according to the ASTM Standard Method of Test for Time of Setting of Hydraulic Cement by Vicat Needle (ASTM C 191-58). The setting times are shown in the table.

| $Ca(NO_2)_2$ concentration, wt. percent of cement | $Ca(NO_3)_2$ concentration, wt. percent of cement | Time of set |
|---|---|---|
| 0 | 0 | 5 hrs. 53 min. |
| 0.80 | 0.26 | 3 hrs. 42 min. |
| 1.59 | 0.51 | 2 hrs. 26 min. |

EXAMPLE 7

This example shows the acceleration of strength development of portland cement mortars with the calcium nitrite of Example 3 under normal curing conditions.

A Type III portland cement was employed in this procedure. Otherwise the procedure was the same as in Example 5. Cubes containing no calcium nitrite were found to have a one day compressive strength of 1090±40 p.s.i. Cubes containing 1.59 weight percent $Ca(NO_2)_2$ were found to have a one day compressive strength of 2247±133 p.s.i.

Obviously, many modifications and variations of the invention, as hereinabove set forth, may be made without departing from the essence and scope thereof, and only such limitations should be applied, as are indicated in the appended claim.

We claim:
1. A cement composition consisting essentially of portland cement and from about 0.1 to 10 percent calcium nitrite based on the dry weight of the portland cement.

References Cited

UNITED STATES PATENTS 3,210,207   10/1965   Dodson _____ 106—90

JAMES E. POER, *Primary Examiner.*

U.S. Cl. X.R.

106—315